Dec. 18, 1962  J. S. WAPNER  3,069,669
METER READOUT SYSTEMS
Filed June 25, 1958  3 Sheets-Sheet 1
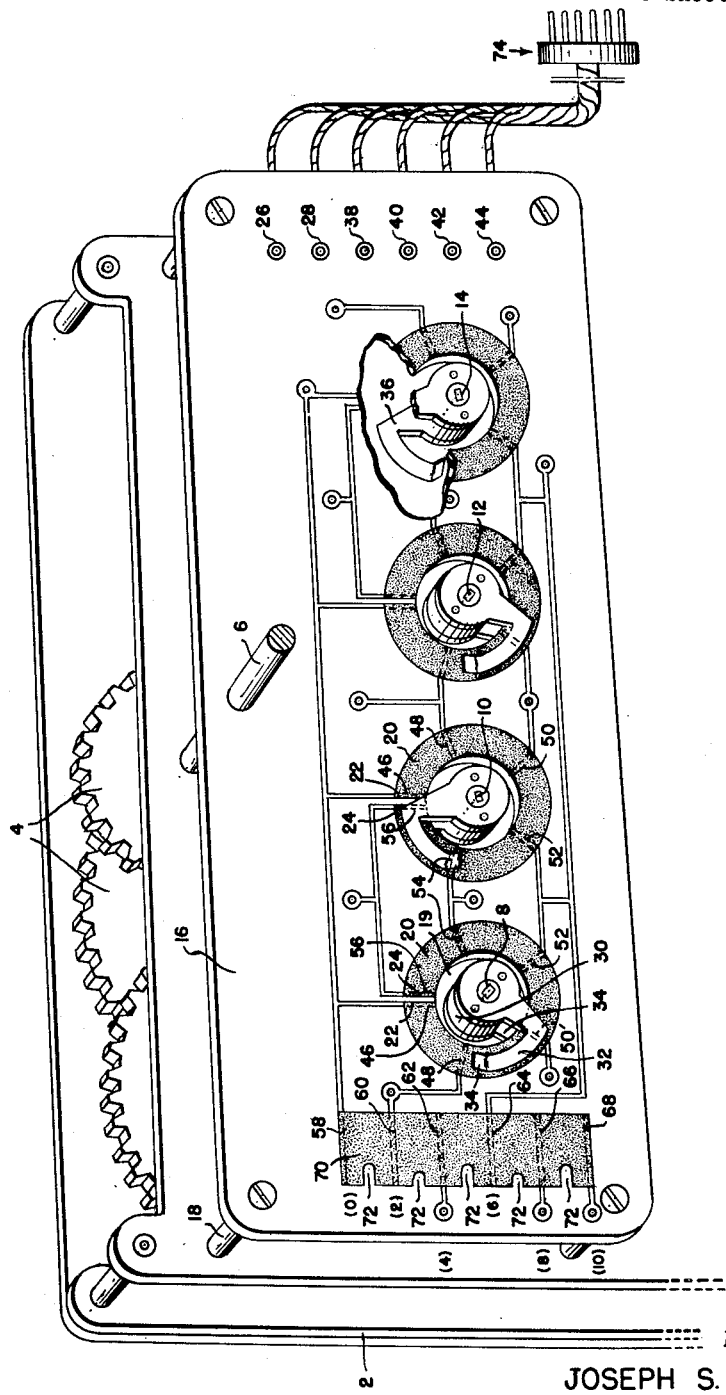
FIG. I.
INVENTOR.
JOSEPH S. WAPNER
BY
ATTORNEYS Dec. 18, 1962  J. S. WAPNER  3,069,669
METER READOUT SYSTEMS
Filed June 25, 1958  3 Sheets-Sheet 2
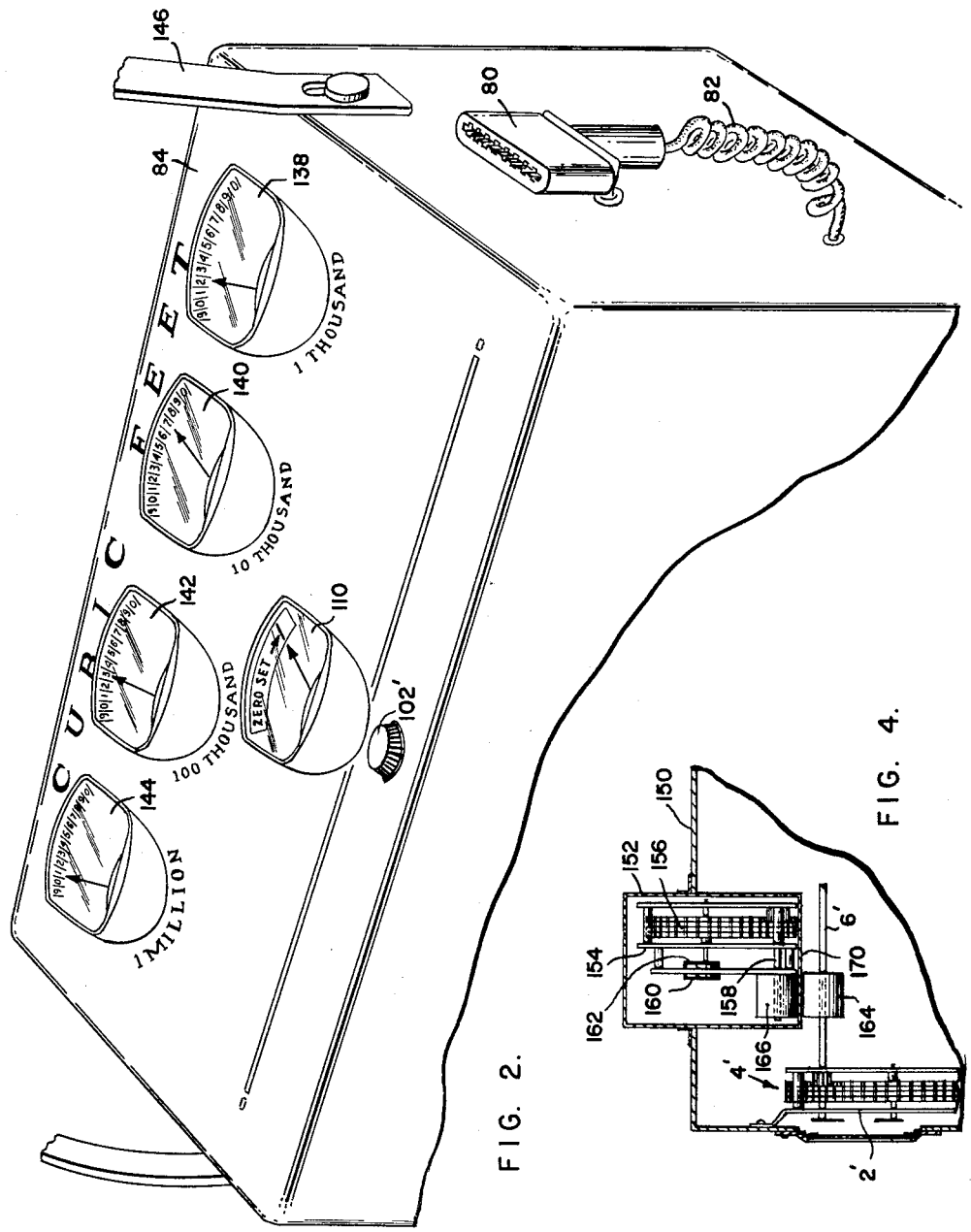
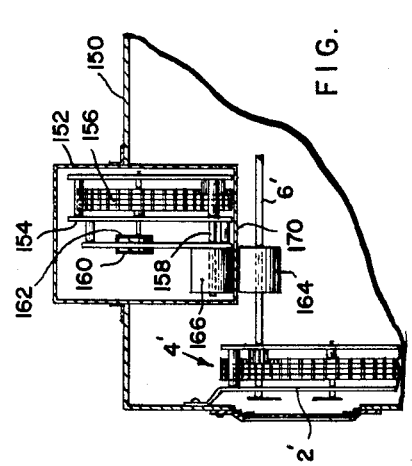
INVENTOR.
JOSEPH S. WAPNER
BY
ATTORNEYS Dec. 18, 1962   J. S. WAPNER   3,069,669
METER READOUT SYSTEMS
Filed June 25, 1958   3 Sheets-Sheet 3

INVENTOR.
JOSEPH S. WAPNER
BY
ATTORNEYS

United States Patent Office 3,069,669
Patented Dec. 18, 1962

3,069,669
METER READOUT SYSTEMS
Joseph S. Wapner, Levittown, Pa., assignor, by mesne assignments, to American Meter Company, Incorporated, Philadelphia, Pa., a corporation of Delaware
Filed June 25, 1958, Ser. No. 744,373
11 Claims. (Cl. 340—188)

This invention relates to meter readout systems and particularly to very simple though accurate readout systems for household meters such as gas meters.

Many systems have been devised for the remote reading of meters, gauges or the like, and these vary greatly in their complexity and accuracy. There is need, however, for a simple readout system which may be applied to household meters and which will satisfy requirements of low cost, simplicity, installation in conventional meters, and other requirements while at the same time providing a high degree of accuracy and avoidance of possibility of misreadings. A problem is particularly posed in the matter of reading gas meters which are almost universally installed within buildings to avoid changes in measurements due to variations of outside temperatures. Being within buildings, particularly private homes, it is necessary for meter readers to gain access to the meter which in general cannot be placed conveniently for reading through windows from the exterior. This entails much trouble in securing readings because of the necessity for repeated visits by the meter readers, and the gas companies have adopted various expedients in order to maintain records, such as sending out cards on which their customers may record their meter readings, which expedients invariably involve much additional clerical work, corrections of errors, etc.

Considering that in any community using gas every household unit is equipped with a meter, it is evident that it would be a matter of prohibitive expense to provide for remote reading any great degree of change in the construction of meters already installed and it would be likewise prohibitive to adopt a system which was in any way elaborate or costly.

It is a general object of the present invention to provide a remote reading system which requires only an easily made change in the dial system of a meter, with the change involving essentially little more than the addition of simple and inexpensive parts. To the modified meter there need then be connected a multiconductor cable leading to a multiterminal external connector at the outside of the building in which the meter is installed. In accordance with the invention no connection need be made to the electrical power system of the building.

The meter reader carries a small box containing an oscillator which provides current to effect reading and which also contains a number of ammeters the readings of which will correspond to those of the meter dial. Reading may be effected merely by coupling a connector to the connector located at the outside of the building.

Further objects of the invention relate to various aspects of the apparatus employed. One of these objects relates to the provision of mean for very easily adjusting or calibrating potentiometers. This aspect of the invention is of more general applicability.

The foregoing and other objects of the invention relating to various details will become apparent from the following description, read in conjunction with the accompanying drawings, in which:

FIGURE 1 is a perspective view showing, in particular, the dial mechanism of a gas meter and the electrical elements associated therewith in accordance with the invention;

FIGURE 2 is a perspective view illustrating the box which is carried by a meter reader in accordance with the invention;

FIGURE 4 is a fragmentary sectional view illustrating a further embodiment of the invention which involves isolation of all electrical circuitry from the interior of a gas meter.

Figure 3:
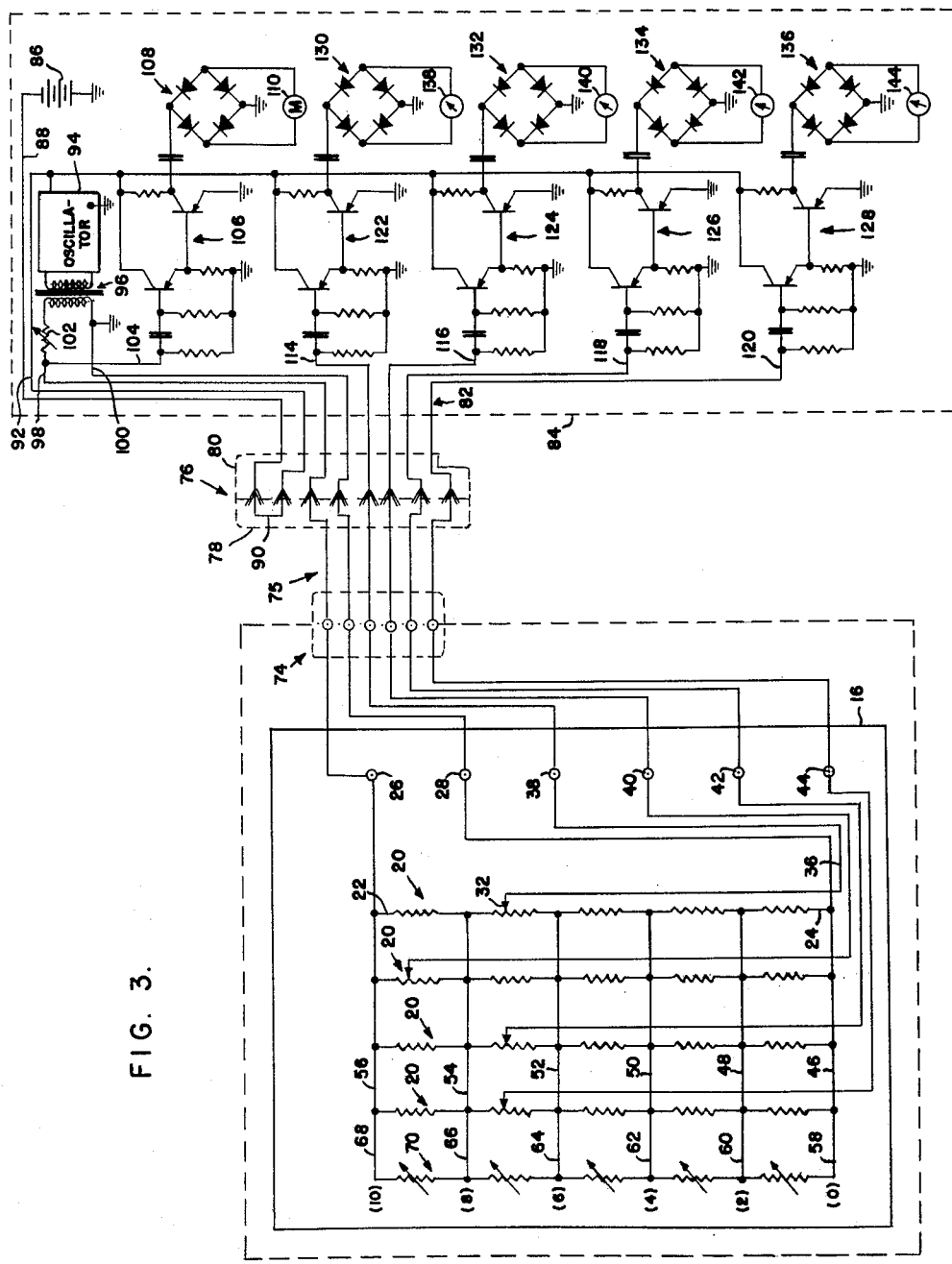
FIGURE 3 is a wiring diagram showing the electrical circuitry involved in accordance with the invention.

Referring to FIGURE 1, there is shown therein the upper portion of a conventional gas meter, there being indicated at 2 the usual dial plate carrying markings with which cooperate the various pointers driven through the usual gearing 4 from the shaft 6 which is driven by the meter output shaft. The pointer shafts indicated at 8, 10, 12 and 14 correspond to readings of gas volume and may, for example, correspond respectively to thousands, tens of thousands, hundreds of thousands and millions of cubic feet. What is shown herein is consistent with the usual arrangement in which the successive shafts have opposite directions of rotation for increasing readings. For example, the shaft 8 in FIGURE 1 may rotate counterclockwise while the shaft 10 rotates clockwise, and so on, for increasing readings. In accordance with a preferred form of the invention, the dials on the front of the meter present their usual aspects for direct readings, the novel parts of the arrangement being mounted behind the gearing and being particularly associated with a printed circuit board 16 mounted by posts 18, the pointer shafts being extended for the present purposes. As will be evident as the description proceeds, the dial assemblies of meters may be replaced by the new assemblies illustrated in FIGURE 1, most of the parts of the old ones being then reused in forming the new assemblies. As will become evident the changes involve primarily the addition of a printed circuit board and potentiometer contacts mounted on the pointer shafts with the addition of a multiple conductor cable running to an external connector.

A potentiometer is associated with each of the shafts 8, 10, 12 and 14 as follows:

Each potentiometer comprises an interrupted circular resistance 20 surrounding an opening 19 in the printed circuit board 16. The particular nature of this resistance will be described hereafter. Its end at the zero of measurement is indicated at 22 and its end at the measurement of 10 is indicated at 24, these ends being only slightly spaced from each other. The wiring diagram shows these resistances in conventionalized fashion as involving in each case five sections joined in series. The ends 22 of all of the resistances are connected to a terminal 26 while the ends 24 are all connected to a terminal 28.

On each of the shafts 8, 10, 12 and 14 there is mounted an insulating hub 30 fixed against rotation and mounting at the rear of the printed circuit board 16 a conducting arm or wiper 32 provided with a contact portion 34 having limited circumferential engagement with the resistance. The hub 30 is also provided with a second arm 36 which has an extension continuously making contact wtih an annular ring of good conducting material which is printed on the board 16 on its front face, this ring not being indicated in the figures. These various rings of the several potentiometers are connected to the terminals 38, 40, 42 and 44 as indicated in FIGURE 3.

If the potentiometers consisted solely of printed resistance material engageable by the contact arms 32, there would be very considerable error involved in correspondence of output potentials with angular positions of the wiper shafts unless the printing of the resistance was very carefully accomplished, which latter would be a matter of great expense. One of the objects of the present invention is the provision of a printed potentiometer arrangement which has a high degree of linear relationship of output potential to angular position of a wiper contact despite the face that the printing involved is very inexpensive and accomplished without the exercise of any substantial care in the way of securing uniformity. For this purpose, before the resistance material at 20 is applied, the good conducting elements of the printed circuit are formed by any one of the usual conventional processes on the board. These conducting elements comprise, as indicated for the left hand potentiometer in FIGURE 1, radial portions 46, 48, 50, 52, 54 and 56 over which the resistance material is provided by painting, printing, or other procedures. These conducting elements are so arranged as to divide the resistance ring in a number of equal segments which are illustrated as five in number, though as will be obvious, other segments may equally well be provided. Because of the high conductivity of the elements 46 to 56, the various segments are bounded at their ends by equipotential lines, so that the complete resistance 20 in the case of each potentiometer is effectively broken up into separate independent resistances such as are electrically diagrammed in FIGURE 3. Considering FIGURE 3 and so much of the printed circutiry as appears at the rear of the board 16 (the additional, and obvious, remaining pritned circuitry at the front of the board not being shown) the corresponding elements of the groups 46 to 56 of the various potentiometers are interconnected so that the segments which they delimit are arranged electrically in parallel as illustrated in FIGURE 3.

Additionally, the various conductors connected to the equipotential elements of the potentiometers are electrically extended as indicated at 58, 60, 62, 64, 66 and 68 so as to underlie and provide equipotential lines across a rectangular resistance area 70 applied over them in the same fashion as the resistance areas 20 of the potentiometers. Additional segments are thus provided in parallel with the potentiometer segments to give rise to the electrical array shown at the left of FIGURE 3. The segments of the resistance area 70 are provided for calibration adjustments which may be made very simply. Considering, as will become clearer hereafter, current input from terminals 26 and 28 across the parallel potentiometers and the parallel resistance area 70, what is desired is that the resistances offered across the successive parallel groups of segments should be equal. In other words, the total resistance appearing between 46 and 48 should be equal to that between 48 and 50, between 50 and 52, and so on. Assuming for example, that the voltage drop between terminals 26 and 28 is 50 millivolts (a typical value which may be provided for in operation) and assuming 28 to have a reference zero potential, it is desirable that the potential of the effective conductor 48 should be 10 millivolts, that of conductor 50, 20 millivolts etc. This result can be achieved by equalizing the resistance groups and this is most readily accomplished in calibration merely by scratching or cutting notches such as indicated at 72 in FIGURE 1 into the resistance segments, the resistances of these segments being originally made too low. These notches may be made in succession with suitable connections to the equipotential conductors involved. If, by chance, too much material is removed, the error may be readily remedied merely by adding some additional resistance material by means of a brush, stamp pad, or the like, this added resistance material becoming parallel to that already present and thus lowering the resistance. The board is completed for assembly when the various resistances are equalized.

The purpose and effect of the foregoing will now be apparent. While it would be very difficult using an inexpensive method of applying resistance material to secure uniformity throughout the approximate 360° of each potentiometer resistance, the resistance between two such equipotentials as 48 and 50, for example, may depart to a very considerable degree from uniformity or linearity without making any material difference to the ultimate reading. For example, the position of the equipotential conductor 48 of the left hand potentiometer in FIGURE 1 would correspond to the digit 2 in the measurement of thousands of cubic feet while the potential at 50 would correspond to 4. As will hereafter appear these potentials are actually read on meters, and if the meters are calibrated in digits, there can be no substantial confusion in proper interpolation between the readings of 2, 3 and 4 occasioned by the presence of the contact 34 in the resistance segment in question. Clearly, with somewhat more elaboration, ten segments could be provided in each potentiometer resistance, but this is quite unnecessary for the purposes here involved. In fact, it is quite satisfactory to provide only four segments instead of five.

As indicated in FIGURE 3, the several terminals 26, 28, 38, 40, 42 and 44 are connected to a meter terminal board 74, to terminals of which are connected the conductors of a cable 75 the conductors being in turn connected to pins or sockets of a connector element 87 which may be secured to the exterior of the wall of a building in which the meter is contained. The other element 80 of the connector provided at 76 has its terminals connected through a cable 82 (see also FIGURE 2) which is connected into a box 84 to be carried by the meter reader.

The right hand portion of FIGURE 3 shows the electrical elements located within the box 84. The physical arrangement is immaterial, and hence the electrical diagram alone is illustrated. To keep this box compact, it involves, desirably, transistor amplifiers and semiconductor rectifiers associated with other miniature elements including small size meters. A battery 86 supplies D.C. power and to provide automatic switching, a lead 88 extends to one of the terminals of connector element 80 while a lead 92 extends from another terminal, shorting between these terminals being provided by a connection 90 in the associated connector element 78. Thus except when the box assembly is plugged in, the battery circuit is opened.

The battery supplies power to an oscillator 94 which is desirably of a miniature transistor type and may take any conventional form. An audio frequency is desirably generated and a frequency of five hundred cycles has been found convenient though the frequency is subject to wide choice. The oscillator output is delivered through a proper matching transformer 96 to the conductors 98 and 100 which lead to the supply terminals for the potentiometers at 26 and 28. In one of these leads there is provided the adjustable resistance 102 which may be set by the meter reader to secure a standard output potential between the connectors 98 and 100 which may typically be about 50 millivolts. To enable the reader to ascertain that this adjustment has been properly made, connection 104 is made through the two stage transistor amplifier arrangement 106 the output of which is delivered to the bridge rectifier 108 to operate the direct current zero set meter 110 which may be provided with a single marking to which the pointer is adjusted by manipulation of the knob 102' which adjusts resistance 102. Through the plug-in connections which may be followed in FIGURE 3, the successive terminals 38, 40, 42 and 44 are connected respectively to the leads 114, 116, 118 and 120 providing inputs to the two stage transistor amplifiers 122, 124, 126 and 128 which respectively supply the diode bridges 130, 132, 134 and 136 energizing the meters 138, 140, 142 and 144 which respectively read in terms of the digits corresponding to thousands, tens of thousands, hundreds of thousands and millions of cubic feet. The operation will now be evident and is, briefly, as follows:

When a reading is to be made, the meter reader carrying a box 84, plugs the connecter 80 into the mating connector 78 in the building wall, adjusts the knob 102' to secure a zero setting on the meter 110, and then reads from the meters 138, 140, 142 and 144 the same values which he would normally read from the dials on the face of the meter. This reading can be accurately accomplished due to the characteristics of the potentiometers and the precalibration thereof as previously described. As in the case of direct reading of the pointers with respect to the dials on the face of the meter, comparison of the successive pairs of the D.C. meters will leave no question of the values to be read. For example, if a pointer of one of the milliammeters reads between the 3 and 4, and the preceding meter reads, for example, 7, it will be obvious that the reading of the first should be 3 rather than 4. Even great non-uniformity of the potentiometer resistances will not give rise to indefinite reading in this respect.

In some cases it may be required that no electrical circuitry be exposed to the interior of a gas meter housing, and it may be desirable to accomplish the ends of the present invention without any substantial modification of the standard meter mechanism. In such cases, the arrangement illustrated in FIGURE 4 may be adopted. The meter is here indicated at 150 and comprises the usual dial plate 2' carrying markings with which cooperate the various pointers driven through the conventional gearing 4' from the shaft 6' which is driven by the meter output shaft. A box 152 provides an enclosure for the readout means and may be formed of brass or other material welded or soldered into an opening provided in the gas meter casing. Within this box 152 there is located a gear mechanism 154 which may be essentially a duplicate of the dial mechanism with the exception that the dial plate and pointers may be omitted. The gearing 156 is driven by the shaft 158, corresponding to shaft 6 of FIGURE 1, and serves to drive the contact wipers 160 and 162 associated with a printed circuit arrangement which may be the same as that described with reference to FIGURE 1. To provide a drive which involves no passage of a shaft from the interior of the meter into the box 152, the shafts 6' and 158 are provided with "meshing" magnetic gears 164 and 166 which come into close proximity on opposite sides of the brass wall 170 of the box. These gears are in the form of ceramic magnets provided with a plurality of alternating north and south poles on their cylindrical surfaces so that as the gear 164 rotates it will drive the corresponding gear 166. Other types of magnetic couplings may, of course, be provided, operating through a wall which provides the desired isolation.

What is claimed is:

1. Apparatus comprising a meter having a plurality of digital indicator shafts, one for each order of digits to be registered, a plurality of potentiometers associated individually with said shafts to move the movable contacts of said potentiometers in correspondence with said shaft positions, means connecting said potentiometers in parallel between input terminals and at several points between said input terminals, individual terminals connected to said movable contacts, and a unit arranged for ready association with and dissociation from said terminals, said unit comprising an oscillator for delivering alternating current to said input terminals and individual metering channels to receive outputs from said individual terminals.

2. A remote reading system for gas and water meters and the like, comprising a first multiple contact connector installed at the building serviced by each meter in a location remote from the meter and accessible to the meter reader, a portable meter read-out device carried by the meter reader having a mating multiple contact connector engageable with said first connector for any of the meters, each meter having a register with a shaft for each order of digits to be registered, a brush on each shaft, means within the meter carrying a potentiometer for each brush, a cable connecting each potentiometer and the associated brush to said first connector, each potentiometer comprising a base, a pair of input terminals carried by said base, a plurality of conductors of high conductivity carried by said base and spaced between said terminals, a coating of resistance material bridging said input terminals and said conductors, means connecting the input terminals and said conductors of the potentiometers in parallel, an indicator in the read-out device for each order of digits to be registered, a power supply carried by the read-out device, and a circuit connecting the power supply through the indicators to said mating connector, said connectors establishing connections from the brushes and input terminals of each potentiometer to the indicator for each order of digits whereby the meter reader can assess the position of the meter register shafts from a location remote from the meter.

3. A remote reading system for gas and water meters and the like, comprising a first multiple contact connector installed at the building serviced by each meter in a location remote from the meter and accessible to the meter reader, a portable meter read-out device carried by the meter reader having a mating multiple contact connector engageable with said first connector for any of the meters, each meter having a register with a shaft for each order of digits to be registered, a printed wiring board within the meter carrying an array of potentiometers, each comprising a contact element mounted for rotation relative to the board about an axis, a pair of spaced input terminals, a plurality of radially disposed conductors of high conductivity spaced between said terminals, and a coating of resistance material disposed concentrically with said axis and bridging said input terminals and said conductors, said contact element being arranged to move in contact with said coating between said input terminals and across said conductors, means connecting the input terminals and said conductors of the potentiometers in parallel, an indicator in the read-out device for each order of digits to be registered, a power supply carried by the read-out devices, and a circuit connecting the power supply through the indicators to said mating connector, said connectors establishing connections from the contact elements and input terminals of each potentiometer to the indicator for each order of digits whereby the meter reader can assess the position of the meter register shafts from a location remote from the meter.

4. The system of claim 3 having in addition a further pair of input terminals, a plurality of conductors of high conductivity spaced between the last mentioned terminals, and a coating of removable resistance material bridging the last mentioned input terminals and conductors, and means electrically connecting the last mentioned conductors to corresponding conductors of the potentiometers.

5. Apparatus comprising a meter having a plurality of digital indicator shafts, one for each order of digits to be registered, a plurality of potentiometers associated individually with said shafts to move the movable contacts of said potentiometers in correspondence with said shaft positions, means connecting said potentiometers in parallel between input terminals and at several points between said input terminals, individual terminals connected to said movable contacts, and a unit arranged for ready association with and dissociation from said terminals, said unit comprising a power supply for delivering a voltage to said input terminals, an indicator for the voltage at the input terminals, means for adjusting the voltage of the power supply to the desired value, and an individual metering channel for each order of digits to be registered for receiving the output from the individual terminals.

6. Apparatus comprising a fluid meter having a plurality of digital indicator shafts, a plurality of potentiometers associated individually with said shafts to provide outputs corresponding to shaft positions, each potentiometer comprising a resistance and a conducting ring insulated from each other and concentric with the associated shaft and wiper means on the shaft making contact with the ring and with a portion of the resistance corresponding to the angular position of the shaft, input terminals for a power supply, means connecting the potentiometer resistances in parallel between said input terminals, an output terminal for each potentiometer connected to its wiper means, and a unit arranged for ready connection to and disconnection from said input and output terminals, said unit comprising a power supply for delivering current to said input terminals and a metering channel for each potentiometer including a meter connected to the potentiometer output terminal and one of the input terminals when said unit is connected to said input and output terminals.

7. Apparatus according to claim 6 including contacts for interrupting the power supply of said unit when said unit disconnected from said terminals and for connecting the power supply when said unit is connected to said terminals.

8. Apparatus comprising a fluid meter having a plurality of digital indicator shafts, a plurality of potentiometers associated individually with said shafts to provide outputs corresponding to shaft positions, each potentiometer comprising a resistance and a conducting ring insulated from each other and concentric with the associated shaft and wiper means on the shaft making contact with the ring and with a portion of the resistance corresponding to the angular position of the shaft, input terminals for a power supply, means connecting the potentiometer resistances in parallel between said input terminals, an output terminal for each potentiometer connected to its wiper means, and a unit arranged for ready connection to and disconnection from said input and output terminals, said unit comprising an oscillator for delivering alternating current to said input terminals and a metering channel for each potentiometer including a meter connected to the potentiometer output terminal and one of the input terminals when said unit is connected to said input and output terminals.

9. A remote reading system for gas and water meters and the like, each meter having a plurality of digital indicator shafts and a plurality of potentiometers associated individually with said shafts to provide outputs corresponding to shaft positions, each potentiometer comprising a resistance and a conducting ring insulated from each other and concentric with the associated shaft and wiper means on the shaft making contact with the ring and with a portion of the resistance corresponding to the angular position of the shaft, input terminals for a power supply, means connecting the potentiometer resistances in parallel between said input terminals, and an output terminal for each potentiometer connected to its wiper means, a first multiple contact connector installed at the building serviced by each meter in a location remote from the meter and accessible to the meter reader, said connector having contacts connected to said input terminals and a plurality of contacts individually connected to a different one of said output terminals, a portable meter read-out device carried by the meter reader having a mating multiple contact connector engageable with said first connector of any one of the meters, said read-out device having a power supply connected to contacts in said mating connector engageable with the contacts in said first connector connected to said input terminals, said read-out device further having an indicator for each digital indicator shaft connected to the contact engageable with the contact in said first connector connected to the output terminal of the potentiometer for the associated digital indicator shaft and said indicator being also connected to one side of the power supply whereby upon engagement of said connectors the digit indicators at the read-out device can indicate the position of the corresponding digital indicator shaft at the meter.

10. A remote reading system for gas and water meters and the like, comprising a first multiple contact connector installed at the building serviced by each meter in a location remote from the meter and accessible to the meter reader, a portable meter readout device carried by the meter reader having a mating multiple contact connector engageable with said first connector for any of the meters, each meter having a register with a shaft for each order of digits to be registered, a brush on each shaft, means within the meter carrying a potentiometer for each brush, a cable connecting each potentiometer and the associated brush to said first connector, each potentiometer comprising a base, a pair of input terminals carried by said base, resistance material bridging said input terminals, means connecting the input terminals of the potentiometers in parallel, an indicator in the read-out device for each order of digits to be registered, a power supply carried by the read-out device, and a circuit connecting the power supply through the indicators to said mating connector, said connectors establishing connections from the brushes and input terminals of each potentiometer to the indicator for each order of digits whereby the meter reader can assess the position of the meter register shafts from a location remote from the meter.

11. A remote reading system for gas and water meters and the like, comprising a first multiple contact connector installed at the building serviced by each meter in a location remote from the meter and accessible to the meter reader, a portable meter read-out device carried by the meter reader having a mating multiple contact connector engageable with said first connector for any of the meters, each meter having a register with a shaft for each order of digits to be registered, a plate within the meter carrying an array of potentiometers, each comprising a contact element mounted for rotation about an axis, a pair of spaced input terminals, resistance material disposed concentrically with said axis and bridging said input terminals, said contact element being arranged to move in contact with said resistance material, means connecting the input terminals of the potentiometers in parallel, an indicator in the read-out device for each order of digits to be registered, a power supply carried by the read-out device, and a circuit connecting the power supply through the indicators to said mating connector, said connectors establishing connections from the contact elements and input terminals of each potentiometer to the indicator for each order of digits whereby the meter reader can assess the position of the meter register shafts from a location remote from the meter.

References Cited in the file of this patent

UNITED STATES PATENTS

| | | |
|---|---|---|
| 2,335,755 | Haddad | Nov. 30, 1943 |
| 2,448,783 | De Giers | Sept. 7, 1948 |
| 2,477,395 | Sunstein | July 26, 1949 |
| 2,538,415 | Ergen | Jan. 16, 1951 |
| 2,724,820 | Foster | Nov. 22, 1955 |
| 2,736,008 | Miller | Feb. 21, 1956 |
| 2,867,705 | Beckwith | Jan. 6, 1959 |
| 2,871,324 | Budd | Jan. 27, 1959 |